United States Patent [19]

Christophliemk et al.

[11] Patent Number: 4,770,866
[45] Date of Patent: Sep. 13, 1988

[54] HYDROTHERMAL PRODUCTION OF CLEAR SODIUM SILICATE SOLUTIONS

[75] Inventors: Peter Christophliemk; Rudolf Novotny, both of Duesseldorf; Juergen von Laufenberg, Haan, all of Fed. Rep. of Germany

[73] Assignee: Henkel Kommanditgesellschaft auf Aktien, Duesseldorf, Fed. Rep. of Germany

[21] Appl. No.: 741,985

[22] Filed: Jun. 6, 1985

[30] Foreign Application Priority Data

Jun. 7, 1984 [DE] Fed. Rep. of Germany ....... 3421158

[51] Int. Cl.⁴ .............................................. C01B 33/22
[52] U.S. Cl. .................................... 423/334; 423/332; 423/333
[58] Field of Search ................ 423/326, 332, 333, 334

[56] References Cited

U.S. PATENT DOCUMENTS

| Re. 1,297 | 4/1962 | Vanderburgh | 423/331 |
|---|---|---|---|
| Re. 1,674 | 5/1964 | Vanderburgh | 423/338 |
| Re. 1,675 | 5/1964 | Vanderburgh | 423/338 |
| Re. 28,540 | 9/1975 | Ball | 415/111 |
| 4,499,062 | 2/1985 | Christophliemk et al. | 423/332 |

FOREIGN PATENT DOCUMENTS

| 0649739 | 12/1964 | Belgium . |
|---|---|---|
| 0033108 | 3/1983 | European Pat. Off. . |
| 0244779 | 3/1912 | Fed. Rep. of Germany . |
| 0216914 | 1/1985 | Fed. Rep. of Germany ...... 423/332 |

OTHER PUBLICATIONS

Chemical Engineering 5, 76 (1962).
Robert A. Perry, *Chemical Engineers' Handbook*, McGraw-Hill Book Company, New York, 1973, pp. 19–63.

*Primary Examiner*—John Doll
*Assistant Examiner*—Jackson Leeds
*Attorney, Agent, or Firm*—Ernest G. Szoke; Henry E. Millson, Jr.; Mark A. Greenfield

[57] ABSTRACT

A process for the hydrothermal production of clear sodium silicate solutions by reacting sand and aqueous NaOH solution wherein an excess of 5 to 10% by weight of sand is used and the reaction is conducted in a rotating pressure vessel until 90 to 95% complete, after which it is transferred and completes in a blow-off vessel.

14 Claims, 1 Drawing Sheet

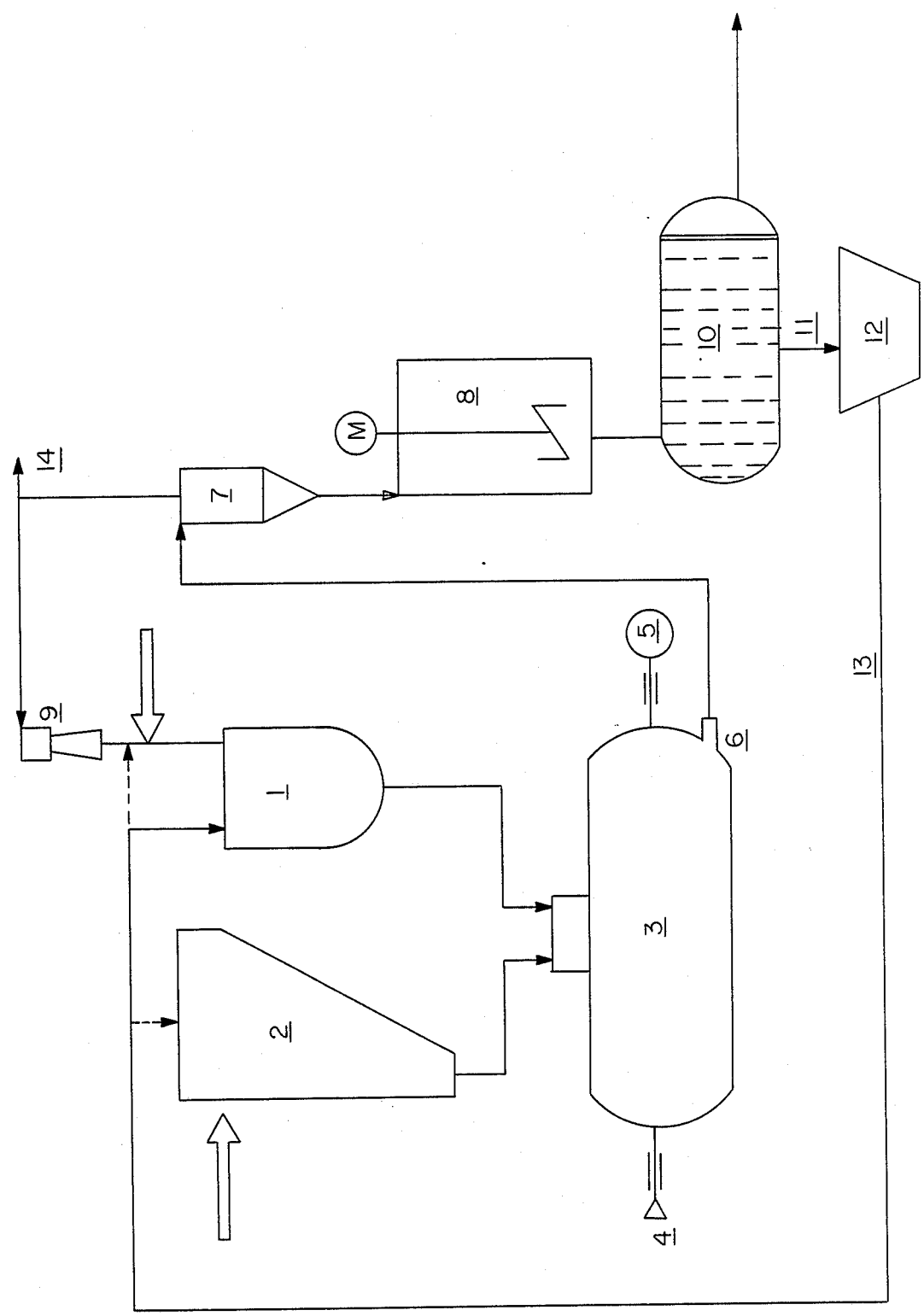

HYDROTHERMAL PRODUCTION OF CLEAR SODIUM SILICATE SOLUTIONS

BACKGROUND OF THE INVENTION

1. Field of the Invention

This invention relates to an improved process for the production of clear sodium silicate solutions from sand and sodium hydroxide under hydrothermal reaction conditions, followed by filtration.

2. Statement of the Related Art

Of the alkali metal silicate solutions known as "waterglass", sodium silicate solutions, known generally as soda waterglass, are the most commonly used for industrial purposes. Soda waterglasses generally have a solids content of from about 30 to 40% by weight and a ratio by weight of $SiO_2$ to $Na_2O$ of 3.3 to 3.4:1.

In general, soda waterglasses are industrially produced by melting quartz sand and soda together at 1,400° to 1,500° C. in suitable furnaces with evolution of $CO_2$. The melt which solidifies on cooling to form lump glass is then dissolved in water in another process step carried out under pressure at elevated temperature and the solution obtained is optionally filtered, depending upon the quality requirements.

By subsequently mixing solutions such as these with sodium hydroxide, it is possible to obtain sodium silicate solutions richer in alkali with a lower ratio by weight of $SiO_2$ to $Na_2O$. However, this process is very extravagant both in terms of plant and in terms of energy demand, incurring correspondingly high energy and plant costs, especially where it is desired to obtain waterglasses particularly rich in alkali with a ratio by weight of $SiO_2$ to $Na_2O$ of the order of 2:1, as required for various technical applications and, above all, for the synthesis of zeolites.

Historically, Van Derburgh reacted silica and alkali with superheated steam in a cylindrical pressure vessel with mechanical stirring, producing solutions (see U.S. Pat. Nos. 28,540; Re. 1,297; Re. 1,674; and Re. 1,675).

Another possible method for producing soda waterglasses is based on the fusion of sand by means of aqueous sodium hydroxide under hydrothermal conditions. Although the principles of this hydrothermal process have been known for some time (see German Pat. No. 244,779 and Chemical Engineering 5, 76 (1962)), processes of this type have only recently acquired any commerical significance due, on the one hand, to their unsatisfactory volume/time yields and, on the other hand, to the considerable difficulties involved in separating and filtering the highly viscous reaction solution.

According to Belgian Pat. No. 649,739, the difficulties involved in working up the reaction mixture may be avoided by separating the reaction product from the excess silica-containing material and/or from the insoluble impurities by means of filtering elements arranged towards the bottom of the reactor, the filtration process advantageously being carried out under temperature and pressure conditions similar to those prevailing during the preceding hydrothermal synthesis. The total reaction time is about 8 to 9 h.

Published European patent application No. 33,108, which is commonly assigned with this invention, describes a hydrothermal sodium silicate solution production process in which sand and NaOH aqueous solution are reacted at 150°-200° C. and corresponding pressure equivalent to that of saturated steam. The reaction is conducted in a cylindrical autoclave rotating about its horizontal axis, and the unreacted excess sand is used as a partial filter medium for the produced solution before being recycled to the production reaction. The produced solution has a $SiO_2$:NaOH weight ratio of 1–2.8:1. The undissolved fines are separated outside the reactor after expansion and cooling of the reaction mixture to around 100° C. This different technical concept has a considerable bearing not only upon the structure of the plant itself, but also upon the potential volume/time yield. Whereas the process according to Belgian Pat. No. 649,739 requires a reaction time of about 4 hours and an at least equally long non-productive time, particularly for filtration inside the reactor, the process according to published European patent application No. 33,108 requires a reaction time of only 60 to 90 minutes and a non-productive time of around 30 minutes.

The reaction time required according to published European patent application No. 33,108 is still too long for a cost-optimal hydrothermal process, competitive with the above-mentioned melting/dissolving process, for the production of clear sodium silicate solutions from sand and waterglass with a ratio by weight of $SiO_2$ to $Na_2O$ of the order of 2:1. In addition, a large excess of sand in the reaction mixture necessitates recycling of the unused sand after filtration which incurs additional costs.

SUMMARY OF THE INVENTION

The present invention provides an improved hydrothermal process for the production of clear soda waterglass solutions from sand and sodium hydroxide with a ratio by weight of $SiO_2$ to $Na_2O$ of approximately 2:1, which is suitable for working on an industrial scale and which is not attended by any of the disadvantages mentioned in the foregoing. More particularly, the invention achieves as high a volume/time yield as possible at the lowest possible temperatures, i.e. with a minimal energy demand.

It has now surprisingly been found that, in a hydrothermal synthesis process carried out under special conditions, the reaction times required for the production of soda waterglass having the indicated composition may be considerably shortened which in turn means that less energy is required. Despite the shortened reaction times, it is possible to obtain a high conversion of the reaction components used which is reflected in a relatively high concentration of $SiO_2$ in the sodium silicate solutions obtained of up to 31% by weight. Soda waterglass solutions with a ratio by weight of $SiO_2$ to $Na_2O$ of 1.9–2.1:1, of the type which are acquiring increasing significance in the production of metasilicates, dihydrogen ortho-silicate hydrates and/or zeolitic sodium aluminium silicates, are formed in very high volume/time yields for a minimal energy requirement.

Accordingly, the present invention affords a process for the hydrothermal production of clear sodium silicate solutions with a ratio by weight of $SiO_2$ to $Na_2O$ of 1.9–2.0:1 by reacting sand containing at least 99% by weight of $SiO_2$, based on dry substance, with an aqueous sodium hydroxide solution having a concentration of 25 to 35% by weight. The process is conducted at temperatures of 200° to 230° C. and under saturated steam pressures corresponding to those temperatures in a rotating, cylindrical, closed pressure reactor which is mounted for rotation about its horizontal axis. This is followed by filtration under normal pressure of the hot reaction mixture still containing undissolved sand, using the unreacted sand as a filter medium. It is characterized in that the reaction mixture contains an excess of sand of from 5 to 10% by weight, based on the silicate content of the desired sodium silicate solution. The above-mentioned reactor comprises several solids entraining nickel or nickel plated elements with an area of from 0.2 to 1 m$^2$ per cubic meter of empty reactor volume. The reaction is conducted at a reactor filing level of from 65 to at most 75% by volume, (including the very finely dispersed steam directly introduced for heating), based on the total empty volume at room temperature. The reaction is continued until the weight ratio of $SiO_2$ to $Na_2O$ in the reaction solution reaches a value which is 5 to 10% below the desired value. Immediately afterward the reaction mixture is transferred under its own pressure to a separate vessel, and the contents of the reactor continue to react to the desired weight ratio of $SiO_2$:$Na_2O$ of 1.9-2.0:1. The reaction mixture is then cooled to 95°-103° C. after expansion to normal pressure with separation of steam. The hydrothermal reaction then comes to a standstill and is filtered using the excess sand and, optionally, an additional filter aid.

As described in detail below, the disadvantages attending state-of-the-art processes are essentially overcome by (1) using the reaction component, sand, in a much smaller excess than was previously considered appropriate, (2) optimizing the course of the reaction through the incorporation of improved plant components, (3) adapting the handling behavior of the hot reaction solution to meet industrial requirements through the incorporation of a simplified expansion vessel in the hydrothermal plant and (4) by recovering much of the process energy by using the steam to heat the sodium hydroxide solution for the following process cycle and by putting the residual heat to a use totally unrealted to the process.

For example, the volume/time yields of the hydrothermal reaction, based on the reaction time proper, are doubled by comparison with the process according to European Patent 33,108.

BRIEF DESCRIPTION OF THE DRAWING

FIG. 1 is a flow chart for the process according to this invention.

DETAILED DESCRIPTION OF THE INVENTION

Other than in the operating examples, or where otherwise indicated, all numbers expressing quantities of ingredients, reaction conditions, or defining parameters used herein are to be understood as modified in all instances by the term "about".

The process according to the invention is carried out in a rotating, cylindrical pressure reactor which is mounted for rotation about its horizontal axis. On its inner wall, this pressure reactor comprises solids entraining elements which are preferably welded on in a radial arrangement. In one preferred embodiment, these entraining elements consist of nickel metal, as does the inner lining of the reactor. The solids entraining elements have a total area of 0.2 to 1.0 m$^2$ per cubic meter of empty reactor volume. For example, the total area of all the solids entraining elements in a reactor having an empty volume of 24 m$^3$ amounts to between 4.8 and 24 m$^2$, this area being shared between several, preferably 8 to 10, solids entraining elements. The combination of the number of solids entraining elements and the size of each is chosen to provide for adequate mixing of the entire contents of the reactor during the hydrothermal reaction.

The cylindrical pressure reactor (autoclave) in which the hydrothermal reaction is carried out is designed so that the mixture of sand and sodium hydroxide present can be heated very quickly to reaction temperatures of 200° to 230° C. To this end, the pressure reactor comprises means which enable saturated steam to be introduced until the desired reaction temperature is reached. The steam introduced may be finely dispersed in the required manner, for example by means of distributor rings or feed nozzles.

In one preferred embodiment, the pressure reactor comprises means which enable steam to be laterally introduced through a rotation shaft directly into the center of the reaction vessel. Introduction of the steam through the shaft of the pressure reactor results in uniform distribution of the steam in the reaction mixture and in rapid, time-saving condensation. In this embodiment, the subsequent introduction of finely dispersed steam, which may be necessary to maintain the reaction temperature, is possible without any loss of time, even with the reactor in operation.

To obtain as rapid and as complete a reaction as possible in the inventive process, the sand used should have an $SiO_2$ content, based on the dry substance, of at least 99.0% by weight. Sands containing more than 99.6% by weight of $SiO_2$, based on the dry substance, are preferred. In addition, the coarse grain fraction on a 0.4 mm sieve as determined in accordance with German Industrial Norm (DIN) 4,188, should preferably be less than 20% by weight. The water content of the sand normally amounts to between 4 and 10% by weight.

The sodium hydroxide used for the hydrothermal reaction in the inventive process should have an actual NaOH content of 25 to 35% by weight. A sodium hydroxide with this concentration is advantageously prepared using thin lyes unrelated to the process and technical sodium hydroxide containing 50% by weight of NaOH. Although the use of a sodium hydroxide having a higher concentration than 35% by weight shortens the hydrothermal reaction time to a certain extent, it is not beneficial either to the overall conduct of the reaction or to costs.

The reaction components, sand and sodium hydroxide, are introduced in batches into the rotating pressure reactor 3 from sand storage vessel 2 and NaOH storage vessel 1. The aqueous sodium hydroxide-sand suspension is heated to the desired reaction temperature of 200°-230° C. while the pressure reactor 3 rotates. To obtain a rapid and, at the same time, inexpensive supply of energy, the reaction mixture is heated by the direct introduction of steam into the pressure reactor 3 through the steam inlet 4. Depending on the insulation of the hydrothermal reactor and the completeness of temperature recovery, i.e. depending upon the temperature of the reaction mixture, about 70 to 150 kg of steam under a pressure of 20 bars have to be introduced per 1000 kg of reaction mixture.

In order to obtain as high a heating rate as possible, saturated steam is preferably introduced into the reaction mixture until the required reaction temperature of 200° to 230° C. is reached. The saturated steam pressure corresponding to that temperature is simultaneously adjusted in the reaction vessel.

The reaction mixture is left in the rotating pressure reactor 3 under the adjusted temperature/pressure conditions until a sample of the solution formed shows that a weight ratio of $SiO_2$ to $Na_2O$ from 5 to 10% below the desired value of from 1.9–2.1:1 has been reached. For example, if a weight ratio of $SiO_2$ to $Na_2O$ of 2.0:1 is required, the reaction mixture is reacted under the specified conditions until the weight ratio has a value of from 1.8–1.9:1. The reaction times required for this purpose are empirically determined in the course of a few reactions by removing a sample of the reaction mixture or, where a suitable in-line measuring instrument is installed, even without sampling. To this end, a measuring instrument 5 is advantageously installed in the shaft of the rotating pressure reactor 3, so that the reactor does not have to be stopped for sampling and the hydrothermal reaction may thus be terminated on reaching the optimal volume/time/energy yield. In such a case, the density and/or viscosity of the sodium silicate solution formed is the preferable measuring means.

It is economically advantageous to gear the hydrothermal reaction as a whole to the final $SiO_2$ concentration required and then to terminate the reaction.

Through the outlet opening 6 in the pressure reactor 3, the liquid reactor contents under a pressure of from 20 to 25 bars are transferred via a steam separator 7 to the blow-off vessel 8. The reaction mixture is transferred under its own pressure. In the steam separator 7, the reaction mixture is separated into waterglass solution and steam.

Transfer of the reactor contents to the blow-off vessel 8 is accompanied by expansion to normal pressure and cooling to around 95° to 103° C., preferably 100°–103° C. Until those temperature and pressure values are reached, the hydrothermal reaction continues to take place so that, after expansion and cooling, an $SiO_2$ concentration corresponding to the required value is reached in the solution. At the same time, the ratio by weight of $SiO_2$ to $Na_2O$ rises to the required value of 1.9–2.1:1.

The reaction mixture is then transferred to a settling filter 10 where sodium silicate solution and undissolved sand are separated from one another. Before the total quantity of sodium silicate solution/sand reaction mixture to be filtered is introduced, the filter bed of the settling filter 10 is advantageously treated with a small recirculated quantity of a sand/sodium hydroxide mixture flowing in from beneath in such a way that the fines of the sand used are floated to the surface of the filter bed to form a sufficiently active filter layer.

The sand present in the reaction mixture serves as an additional filter medium. This sand also contains relatively coarse and relatively fine constituents, the fines likewise being floated to the surface of the filter bed.

In one preferred embodiment of the process according to the invention, a filter aid is added to the circulating sand-sodium hydroxide mixture in a small quantity, for example 0.5 to 2 kg per tonne (1,000 kg) of waterglass solution. Preferred filter aids are those based on perlite because they do not dissolve to any significant extent during the filtration process, but dissolve to a very large extent under the hydrothermal fusion conditions when, as described below, the filter sludge is transferred to the hydrothermal reactor. By using filter aids such as these which are largely soluble under the hydrothermal reaction conditions, not only are the costs for the removal of filter sludge minimized, but also $SiO_2$ and alkali are recovered and the heat content of the filter sludge is used for the following reaction cycle.

On completion of filtration, the filter sludge is, if desired, briefly washed and then ejected through the ejection opening 11 into the filter sludge collecting vessel 12. Filter sludges of suitable composition emanating from outside the process may also be delivered to that vessel.

In one preferred embodiment of the inventive process, the filter sludges (to which a little water or sodium hydroxide may optionally be added) are alternately transported by a conveyor system 13 from the filter sludge collecting vessel 12 to the sand or sodium hydroxide storage vessels 2 or 1. In this way, the unreacted starting materials are recycled in the reaction to the benefit of process economy. In addition, the energy content of the filter sludges, of which the temperature is still relatively high, is used for the following process cycle. In this embodiment of the process, the $SiO_2$ and NaOH content of the filter sludges has to be deducted from the quantities of sand or sodium hydroxide in the batch when calculating the quantities in which the reaction components are to be used.

The steam separated from the reaction mixture in the steam separator 7 is taken in by a jet apparatus and may be used to preheat at least one of the reaction components of another process cycle. In this embodiment, the sodium hydroxide, optionally in admixture with recycled filter sludge, is heated in a Venturi nozzle 9 to the limit of the boiling temperature of the lye, i.e. to about 100°–103° C. The remaining steam escapes at 14 through a dropping separator (not shown) into the atmosphere or is used in external processes for further energy recovery.

In this process, clear sodium silicate solutions are obtained in which the weight ratio of $SiO_2$ to $Na_2O$ is 1.9–2.1:1. The energy requirement is distinctly reduced by comparison with state-of-the-art processes through the modified conduct of the process and the appreciable recovery of energy. The disadvantages of the processes known from Belgian Pat. No. 649,739 and from published European patent application No. 33,108 are largely overcome by the fact that the process is carried out with only a small excess of sand in a hydrothermal plant which provides for better handling of the hot reaction solution. Despite the use of only a small excess of sand in the reaction mixture, the reaction times are clearly reduced.

However, the most important advantage of the process according to the invention lies in the fact that it enables the volume/time yields, based on the reaction time proper, to be increased by 100%, an amount which is only rarely achieved in an industrial process.

The significance of the industrial process according to the invention is made particularly clear by comparing the reactor outputs after continuous operation under industrial conditions, for example for 12 months at a rate of 8200 working hours per year, taking into account the various stoppage times required for cleaning, maintenance and repairs. The following capacity calculation is aimed at the dissolution of sand containing 4.1% of water and, accordingly, is based on dissolved $SiO_2$. The advantage of this is that the values thus obtained are independent of concentrations and ratios by weight of $SiO_2$ to $Na_2O$ in the reaction product and also of the quantity of alkali introduced which would otherwise have to be introduced into the calculation of a sodium silicate capacity for calculating the yield. In addition, the capacity calculation is normalized to the useful reactor volume. As is known from the prior art, hydrothermal reactors are normally filled to only 75% of their empty volume. A useful reactor volume of 18 m$^3$ is calculated for the comparison of the reactors (empty volume 24 m$^3$) described in published European patent application No. 33,108 and in Examples 1 to 6 below.

Calculation of the volume/time yield in the production of sodium silicate in accordance with Example 1 of Belgian Pat. No. 649,739 for a running time of at least 8 hours per batch (reaction time plus non-productive time) gives 1,025 batches per year each containing 1,817 kg of dissolved SiO$_2$ for a useful reactor volume of 4 m$^3$. This corresponds to a quantity of 465.7 tonne (t) or 1,000 kg of dissolved SiO$_2$ per m$^3$ of useful reactor volume per year. Based on a sodium silicate solution having an SiO$_2$ concentration of 30% by weight and normalized to an industrial plant having a useful reactor volume of 18 m$^3$, this corresponds to an annual capacity of 27,941 t of waterglass solution.

Calculation of the volume/time yields of the process according to published European patent application No. 33,108, Example 2, for a reaction time of 1.5 h and a non-productive time (for filling the reactor and transferring the reaction product to the external filtration unit) of 0.5 h gives 4,100 batches per year each containing 2,887 kg of dissolved SiO$_2$ for a useful reactor volume of 18 m$^3$. This corresponds to a quantity of 657.6 t of dissolved SiO$_2$ per cubic meter of useful reactor volume per year. Based on a sodium silicate solution having an SiO$_2$ concentration of 30% by weight and a useful reactor volume of 18 m$^3$, the annual capacity of the plant described in the published European patent application amounts to 39,456 t of product. This corresponds to an increase in capacity over the plant described in Belgian Pat. No. 649,739 of 41.2% per year.

Examples 1 to 6 below show that with the process according to the invention the reaction time can be shortened to 60 minutes. Together with non-productive times of 30 minutes for filling the reactor, therefore, this gives 5,466 batches per year each containing 6,705 kg of dissolved SiO$_2$ for a useful reactor volume of 18 m$^3$ (see Examples 1 and 4; the other Examples produce even higher values). This corresponds to a quantity of 2,036.2 t of dissolved SiO$_2$ per cubic meter of useful reactor volume per year. Based on a sodium silicate solution containing 30% by weight of SiO$_2$, the annual capacity of the process according to the invention amounts to 122,171 t of waterglass solution for a reactor volume of 18 m$^3$. This represents an increase in capacity of 209% over the process according to published European patent application No. 33,108.

The invention is illustrated by Examples 1 to 6 below which were carried out on an industrial scale. The reaction vessel used was a horizontally arranged cylindrical pressure reactor of steel with a nickel lining which had an empty volume of 24 m$^3$. The nine solids entraining plates of nickel welded internally in a radial arrangement each had an area of 0.8 m$^2$, so that the total area of the entraining plates amounted to 7.2 m$^2$. The pressure reactor rotated at a speed of 6 r.p.m. about its horizontal central axis. The reactor contents were heated by saturated steam under a pressure of 20 or 25 bars which was finely dispersed by a distributor ring and directly introduced into the reactor through an opening in its shaft and an attached pipe.

The sand used contained 4.1% by weight of water. Its SiO$_2$ content, based on dry substance, amounted to 99.8% by weight. Granulometry in accordance with German Industrial Norm (DIN) 4,188 produced a coarse grain fraction on a 0.4 mm sieve of 12.9% by weight.

The filter sludge accumulating from the solids filter was pumped into the sodium hydroxide storage vessel in the quantities indicated in Table 1 by means of a 2-cylinder piston pump. The test arrangement substantially corresponded to FIG. 1.

The sodium hydroxide was prepared from technical sodium hydroxide containing 50% by weight of NaOH and thin lye unconnected with the process having an NaOH content of 14% by weight and was heated by the steam to around 103° C. in a Venturi nozzle above the sodium hydroxide storage vessel.

From the preceding batches, the reactor contained approx. 150 kg of sand (based on dry substance) and 150 kg of sodium silicate solution having the composition indicated in the respective Examples. The Examples were selected from several industrial batches characterized by the same mixture ratios and reaction conditions, so that the residue of reaction solution remaining in the reactor always had very much the same composition as the end product aimed at in the Example.

The reaction components (sand, filter sludge, 50% and 14% sodium hydroxide, steam) were introduced into the reactor, their quantities being accurately measured to ±10 kg by a weighing machine. The reactor was then closed and set rotating. The reaction mixture was heated to the reaction temperature indicated by the direct introduction of steam and was left at that temperature with more steam occasionally being introduced. Steam under a pressure of 25 bars, corresponding to 225°±3° C., was used in Examples 1 to 3 and steam under a pressure of 20 bars, corresponding to 210°±2° C., in Examples 4 to 6.

After the indicated reaction time at that temperature, the reactor was stopped. Through a flanged-on pipe, the reaction mixture was transferred under its own pressure to a 30 m$^3$ blow-off vessel. In this way, the reaction mixture was separated by means of a separator into vapors and waterglass solution having a temperature of around 105° C. The vapors were taken in by a jet apparatus and used to preheat the mixed lye of the next batch in a Venturi nozzle to the limit of the boiling temperature of the lye (around 103° C.). The remaining steam was used to heat industrial water for other purposes.

The waterglass solution, which had a temperature of around 100° C., was filtered by means of a settling filter. First, a quantity of around 3 m$^3$ of the reaction solution was pumped into the settling vessel belonging to the filter where 15 kg of perlite-based filter aid were added and the resulting suspension pumped back into the blow-off vessel. Thereafter, another 3 m$^3$ of reaction solution were pumped from the blow-off vessel into the settling vessel of the filter unit to settle in the filter. After the addition of 7.5 kg of the filter aid, the suspension was pump-circulated through the filter and the blow-off vessel until a clear solution was obtained. Only then was the reaction mixture from the blow-off vessel filtered clear through the settling filter.

The sodium silicate solutions thus obtained were water-clear and colorless and were analyzed for their SiO$_2$ and Na$_2$O contents.

In the interests of better reproducibility, the filter sludge used in the Examples was taken from a mixture of several thoroughly mixed batches after identification beforehand. Based on dry substance (according to estimates from analytical data, powder photographs and sedimentation measurements), the sludge contained approximately 65% by weight of sand, 25% by weight of filter aid, 5% by weight of water-soluble sodium silicate (weight ratio of $SiO_2:Na_2O$ was 2.0:1) from the solution adhering to the filter sludge despite washing and around 5% by weight of heavy metal silicate and other unidentified residues from the hydrothermal reaction.

The particular quantities of materials used in the Examples are shown in Table 1, the reaction conditions and product characterizations in Table 2.

In Example 3, the quantity of sodium hydroxide in the process lye was reduced to obtain a higher weight ratio of $SiO_2$ to $Na_2O$ in the reaction solution of 2.2:1, by comparison with Example 1. After a 35-minute hydrothermal reaction, the reaction mixture was transferred to the blow-off vessel with a weight ratio of $SiO_2$ to $Na_2O$ of 2.15:1 (29.4% by weight of $SiO_2$).

Examples 4 to 6 were carried out in largely the same way as Examples 1 to 3. A longer reaction time was necessary to obtain the desired weight ratio of $SiO_2$ to $Na_2O$ because of the lower reaction temperature and the lower pressure (20 as against 25 bars steam).

We claim:

1. In a process for the hydrothermal production of clear sodium silicate solutions with a weight ratio of $SiO_2:Na_2O$ of about 1.9–2.1:1 by reacting an excess of sand containing at least 99% by dry weight of $SiO_2$ with an aqueous sodium hydroxide solution having a concentration of 25 to 35% by weight at temperatures of 200° to 230° C. and under saturated steam pressures corresponding to those temperatures, in a rotating, cylindrical, closed pressure reactor which is mounted for rotation about its horizontal axis, followed by filtration under normal pressure of the hot reaction mixture still containing undissolved sand using the unreacted sand as filter medium, the improvements wherein:
   (a) the reaction mixture consists essentially of an excess of sand of about 5 to 10% by weight, based on the silicate content of the desired sodium silicate solution, and a 25 to 35% sodium hydroxide solution preheated by process heat;
   (b) and is then reacted in said reactor, which comprises several welded solids entraining elements having an area of from 0.2–1 $m^2$ per $m^3$ of empty reactor volume;
   (c) at a reactor filling level, based on the total empty volume at room temperature, of 65 to 75% by

TABLE 1

| | Batch data | | | | | | |
|---|---|---|---|---|---|---|---|
| | Starting materials and quantities[1] | | | % of NaOH | Ratio by weight | | |
| Example No. | Sand[2] | Filter sludge[3] | Sodium hydroxide 50% | Sodium hydroxide 14% | in the mixed lye | of $SiO_2$ to $Na_2O$ in the batch[4] | Steam input[1] | Total quantity of batch[5] |
| 1 | 7.58 | — | 6.33 | 8.97 | 28.9 | 2.16 | 3.3 | 26.5 |
| 2 | 7.73 | 0.25 | 7.35 | 6.56 | 34.8 | 2.18 | 3.2 | 24.5 |
| 3 | 7.73 | 0.25 | 6.90 | 5.30 | 34.8 | 2.30 | 4.0 | 24.5 |
| 4 | 7.60 | — | 6.33 | 8.87 | 28.9 | 2.16 | 2.8 | 26.0 |
| 5 | 7.77 | 0.15 | 6.56 | 5.04 | 30.2 | 2.18 | 3.4 | 23.2 |
| 6 | 7.77 | 0.15 | 6.90 | 5.30 | 34.8 | 2.30 | 4.0 | 24.5 |

[1] In tonnes per reactor charge.
[2] Containing 4.1% by weight of water; plus residual quantities remaining in the reactor as per text.
[3] Moist, composition: 65% sand, 25% filter aid, 5% water-soluble sodium silicate, 5% heavy metal silicates and other residues.
[4] Taking into account all the $SiO_2$ and $Na_2O$ components present in the reactor.
[5] Including steam and residues remaining in the reactor from previous batches.

TABLE 2

| | Reaction conditions and product characterization | | | | | | |
|---|---|---|---|---|---|---|---|
| | Reactor filling | HT-reaction conditions | | | Filtered end product | | |
| Example No. | level[1] | (minutes) HT[2] | RT[3] | Reaction temperature (°C.) | Density[4] | % $SiO_2$ | % $Na_2O$ | Ratio by weight of $SiO_2$ to $Na_2O$ |
| 1 | 73 | 35 | 27 | 225 | 1.47 | 27.00 | 13.17 | 2.05 |
| 2 | 67 | 28 | 29 | 225 | 1.58 | 31.04 | 15.52 | 2.00 |
| 3 | 67 | 28 | 35 | 225 | 1.52 | 30.01 | 13.04 | 2.20 |
| 4 | 73 | 28 | 32 | 210 | 1.48 | 27.05 | 13.37 | 2.02 |
| 5 | 63 | 25 | 29 | 210 | 1.52 | 29.00 | 14.50 | 2.00 |
| 6 | 66 | 27 | 36 | 210 | 1.54 | 29.90 | 13.91 | 2.15 |

[1] In % by volume, determined from the quantities used and yields, based on normal pressure and total empty volume (24 $m^3$).
[2] Heating Time = time between closure of the reactor and reaching the reaction temperature.
[3] Reaction Time = time between reaching the reaction temperature and transfer of the reaction solution to the blow-off vessel.
[4] At 20° C.

Results:

Example 1 illustrates a favorable batch—with regard to the relatively low starting concentration of the process lye (high percentage of inexpensive thin lye in the mixed lye) and the volume/time/energy yield obtained—without recycling of the filter sludge and with only a very small excess of sand. When the hydrothermal reaction was terminated after 27 mins., analysis of an intermediate sample showed that the weight ratio of $SiO_2$ to $Na_2O$ in the filtered reaction solution amounted to 1.99:1 for an $SiO_2$ content of approx. 26.3% by weight.

The greatly increased solids content in the reaction solution of Example 2 as compared with Example 1 was achieved by a distinctly increased process lye concentration and, at the same time, a larger excess of sand for only a slightly longer reaction time despite recycling of the filter sludge. However, the total yield was significantly reduced as a result. After a 29-minute duration of the hydrothermal reaction, the reaction mixture was transferred to the blow-off vessel with a weight ratio of $SiO_2$ to $Na_2O$ of 1.97:1 ($SiO_2$ content 28.7% by weight).

volume, including the very finely dispersed steam directly introduced for heating;

(d) until the weight ratio of $SiO_2:Na_2O$ in the reacting solution reaches a value which is 5 to 10% below the desired value of 1.9–2.1:1;

(e) immediately after which the reaction mixure is transferred under its own pressure to a blow-off vessel, the contents of the reactor continuing to react until a value within said desired $SiO_2:Na_2O$ weight ratio is obtained; after which (f) the reaction mixture is cooled to 95°–103° C. With separation of steam after expansion to normal pressure, the hydrothermal reaction coming to a standstill;

(g) the reaction mixture is filtered using at least the excess sand as a filter;

(h) said sand has a $SiO_2$ content of at least 99.6% dry weight, with a coarse grain fraction on a 0.4 mm sieve of up to about 20% by weight;

(i) said aqueous hydroxide solution is produced by diluting technical sodium hydroxide containing 50% by weight of NaOH with thin lye emanating from outside the process;

(j) a perlite silicate material which is soluble under the conditions of the hydrothermal reaction, but largely insoluble at 100° C./1 bar, is used as an additional filter aid; and (k) said reaction mixture is filtered by means of a settling filter.

2. The process of claim 1 wherein the internal lining of the pressure reactor and the welded solids entraining elements both consist of nickel metal.

3. The process of claim 1 wherein the filter residue is recycled within the process, a proportion of the sand and the sodium hydroxide in the batch corresponding to the $SiO_2$ and alkali content of the filter sludge being deducted.

4. The process of claim 1 wherein saturated, finely dispersed steam is used for heating and is introduced through an opening in the shaft of said cylindrical pressure reactor and an attached pipe.

5. The process of claim 2 wherein saturated, finely dispersed steam is used for heating and is introduced through an opening in the shaft of said cylindrical pressure reactor and an attached pipe.

6. The process of claim 3 wherein saturated, finely dispersed steam is used for heating and is introduced through an opening in the shaft of said cylindrical pressure reactor and an attached pipe.

7. The process of claim 1 wherein:
(1) the internal lining of the pressure reactor and the welded solids entraining elements both consist of nickel metal;
(2) the filter residue is recycled within the process, a proportion of the sand and the sodium hydroxide in the batch corresponding to the $SiO_2$ and alkali content of the filter sludge being deducted;
(3) saturated, finely dispersed steam is used for heating and is introduced through an opening in the shaft of said cylindrical pressure reactor and an attached pipe; and
(4) said reaction mixture is filtered by means of a settling filter.

8. The process of claim 2 wherein:
(1) the internal lining of the pressure reactor and the welded solids entraining elements both consist of nickel metal;
(2) the filter residue is recycled within the process, a proportion of the sand and the sodium hydroxide in the batch corresponding to the $SiO_2$ and alkali content of the filter sludge being deducted;
(3) saturated, finely dispersed stem is used for heating and is introduced through an opening in the shaft of said cylindrical pressure reactor and an attached pipe; and
(4) said reaction mixture is filtered by means of a settling filter.

9. The process of claim 3 wherein:
(1) the internal lining of the pressure reactor and the welded solids entraining elements both consist of nickel metal;
(2) the filter residue is recycled within the process, a proportion of the sand and the sodium hydroxide in the batch corresponding to the $SiO_2$ and alkali content of the filter sludge being deducted;
(3) saturated, finely dispersed steam is used for heating and is introduced through an opening in the shaft of said cylindrical pressure reactor and an attachted pipe; and
(4) said reaction mixture is filtered by means of a settling filter, 10. The process of claim 4 wherein:
(1) the internal lining of the pressure reactor and the welded solids entraining elements both consist of nickel metal;
(2) the filter residue is recycled withing the process, a proportion of the sand and the sodium hydroxide in the batch corresponding to the $SiO_2$ and alkali content of the filter sludge being deducted;
(3) saturated, finely dispersed steam is used for heating and is introduced through an opening in the shaft of said cylindrical pressure reactor and an attached pipe; and
(4) said reaction mixture is filtered by means of a settling filter.

11. The process of claim 5 wherein:
(1) the internal lining of the pressure reactor and the welded solids entraining elements both consist of nickel metal;
(2) the filter residue is recylced within the process, a proportion of the sand and the sodium hydroxide in the batch corresponding to the $SiO_2$ and alkali content of the filter sludge being deducted;
(3) saturated, finely dispersed steam is used for heating and is introduced through an opening in the shaft of said cylindrical pressure reactor and an attached pipe; and
(4) said reaction mixture is filtered by means of a settling filter.

12. The process of claim 6 wherein:
(1) the internal lining of the pressure reactor and the welded solids entraining elements both consist of nickel metal;
(2) the filter residue is recycled within the process, a proportion of the sand and the sodium hydroxide in the batch corresponding to the $SiO_2$ and alkali content of the filter sludge being deducted;
(3) saturated, finley dispersed steam is used for heating and is introduced through an opening in the shaft of said cylindrical pressure reactor and an attached pipe; and
(4) said reaction mixture is filtered by means of a settling filter.

13. A two-step reaction process for the hydrothermal production of clear sodium silicate solution comprising:

(A) reacting (a) an excess of sand consisting essentially of about 5 to 10% by weight based upon the silicate content of the desired sodium silicate solution, said sand having an $SiO_2$ content of at least 99.6% dry weight and a coarse grain fraction on a 0.4 mm sieve of up to about 20% by weight; with (b) an aqueous sodium hydroxide solution which is preheated by process heat and is produced by diluting technical sodium hydroxide containing 50% by weight of NaOH with thin lye emanating from outside the process and having an actual NaOH concentration of 25% to 35% by weight; said reaction using directly introduced finely disperses saturated stasm as a source of heat; and said reaction being conducted at 200° to 230° C. and under the corresponding pressures of saturated steam until the weight ratio of $SiO_2:Na_2O$ in the reaction solution reaches a value for said $SiO_2$ of 5 to 10% below an ultimate desired ratio of 1.9–2.1:1; and then (B) transferring said reaction mixture under its own pressure to a blow-off vessel while permitting said reaction to continue until a value witin said desired $SiO_2:NaO_2$ ratio of 1.9–2.1:1 is achieved; during which the reaction mixture is cooled to about 95° to 103° C. with separation of steam after expansion to normal pressure and cessation of the hydrothermal reaction; followed by filteration of the reaction mixture using any excess unreacted sand still present as a filter, and/or a settling filter, with a perlite silicate material which is soluble under the conditions of the hydrothermal reaction but largely insoluble at 100° C./1 bar as an additional filter aid.

14. The process of claim 13 wherein the filer residue is recycled within the process, a proportion of the sand and the sodium hydroxide in the batch corresponding to the $SiO_2$ and alkali content of the filter sludge being deducted.

* * * * *